United States Patent [19]
Welschof et al.

[11] Patent Number: 4,858,998
[45] Date of Patent: Aug. 22, 1989

[54] WHEEL SUPPORTING ASSEMBLY

[75] Inventors: Hans-Heinrich Welschof, Rodenbach; Rudolf Beier, Offenbach, both of Fed. Rep. of Germany

[73] Assignee: Lohr & Bromkamp GmbH, Offenbach/Main, Fed. Rep. of Germany

[21] Appl. No.: 142,506

[22] Filed: Jan. 11, 1988

[30] Foreign Application Priority Data

Jan. 10, 1987 [DE] Fed. Rep. of Germany ....... 3700564

[51] Int. Cl.$^4$ ............................................ B60B 27/02
[52] U.S. Cl. .................................. 301/124 R; 180/258; 464/178; 464/906
[58] Field of Search ............... 301/124 R, 124 H, 126, 301/125, 131; 180/258, 259, 70.1, 73.3, 73.4, 253, 254; 464/178, 906

[56] References Cited

U.S. PATENT DOCUMENTS

| | | | |
|---|---|---|---|
| 2,991,729 | 7/1961 | Matsui . | |
| 4,046,433 | 9/1977 | Keiner | 301/126 |
| 4,300,651 | 11/1981 | Krude | 464/906 |
| 4,536,038 | 8/1985 | Krude | 464/906 |
| 4,591,212 | 5/1986 | Balken et al. | 301/125 |

FOREIGN PATENT DOCUMENTS

| | | |
|---|---|---|
| 3209690 | 7/1983 | Fed. Rep. of Germany . |
| 3339358 | 5/1984 | Fed. Rep. of Germany . |
| 2130661 | 6/1984 | United Kingdom . |

Primary Examiner—James B. Marbert
Attorney, Agent, or Firm—Toren, McGeady & Associates

[57] ABSTRACT

A wheel supporting assembly for a motor vehicle, comprising a wheel carrier member (1) with means for attachment to at least one suspension component, and a unit of hub member (16), universal joint member (21), and bearing with outer race (15) integral with or received in a bearing housing (3), secured to the wheel carrier member. The wheel carrier member affords a formation (2) open and undercut-free in a direction transversely of the rotational axis of the hub member, so that the hub member-bearing unit can be fitted radially to the wheel carrier member. The bearing housing of the unit is then held to the wheel carrier member by at least two fixing elements, particularly bolts, spaced from one another by a distance greater than an outer diameter of the bearing, which distance is preferably less than the size of a flange on the hub member to which a wheel is to be attached.

21 Claims, 5 Drawing Sheets

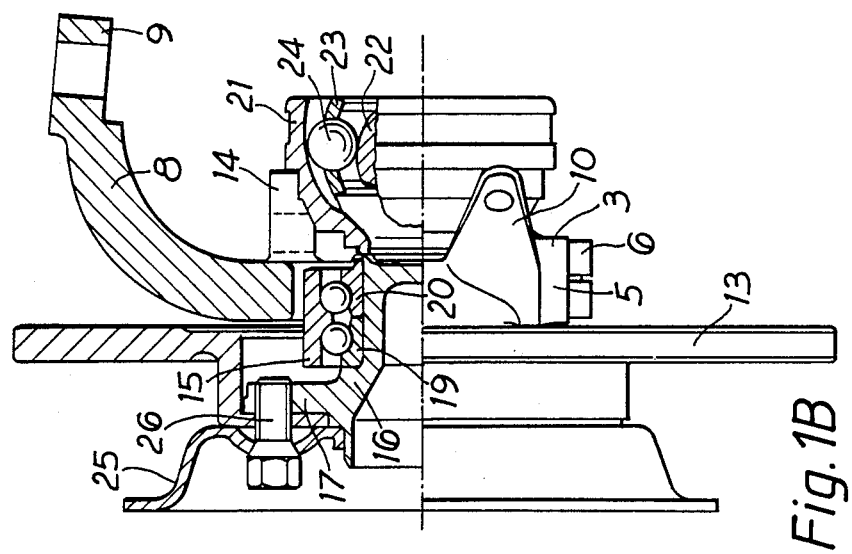
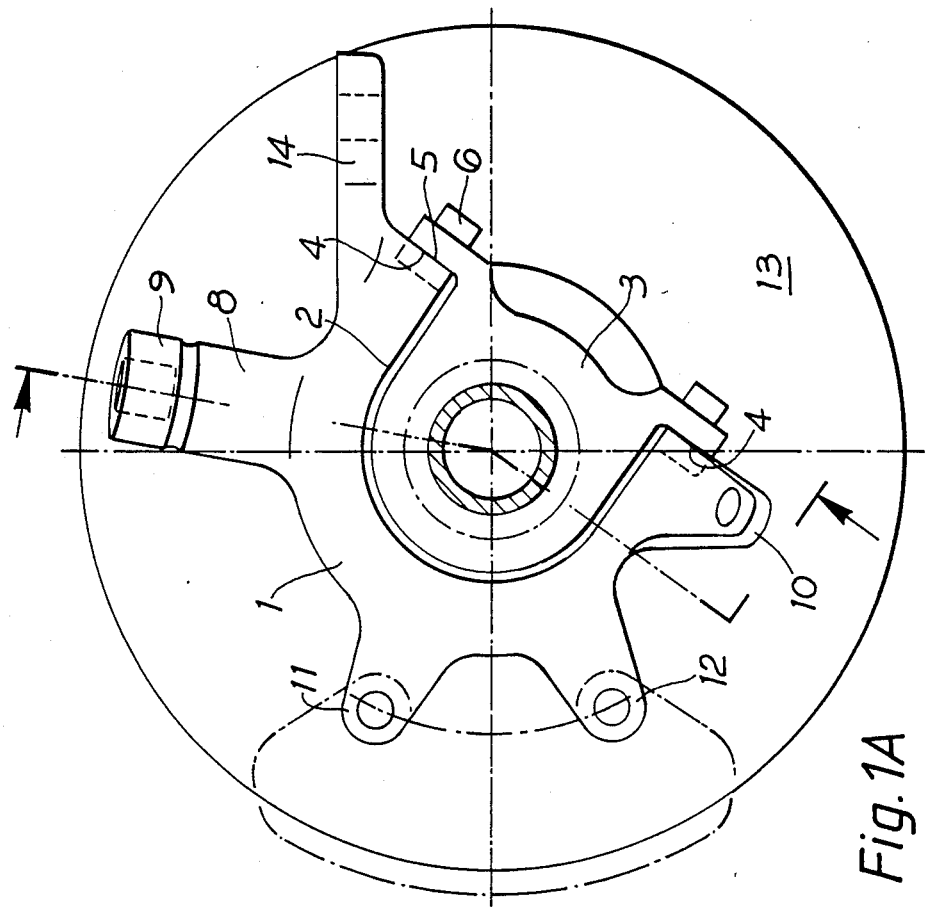
Fig. 1B
Fig. 1A

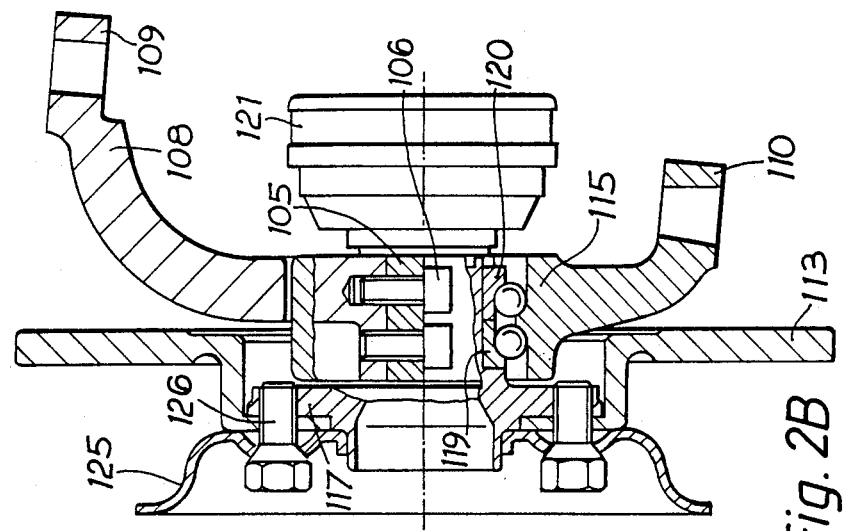
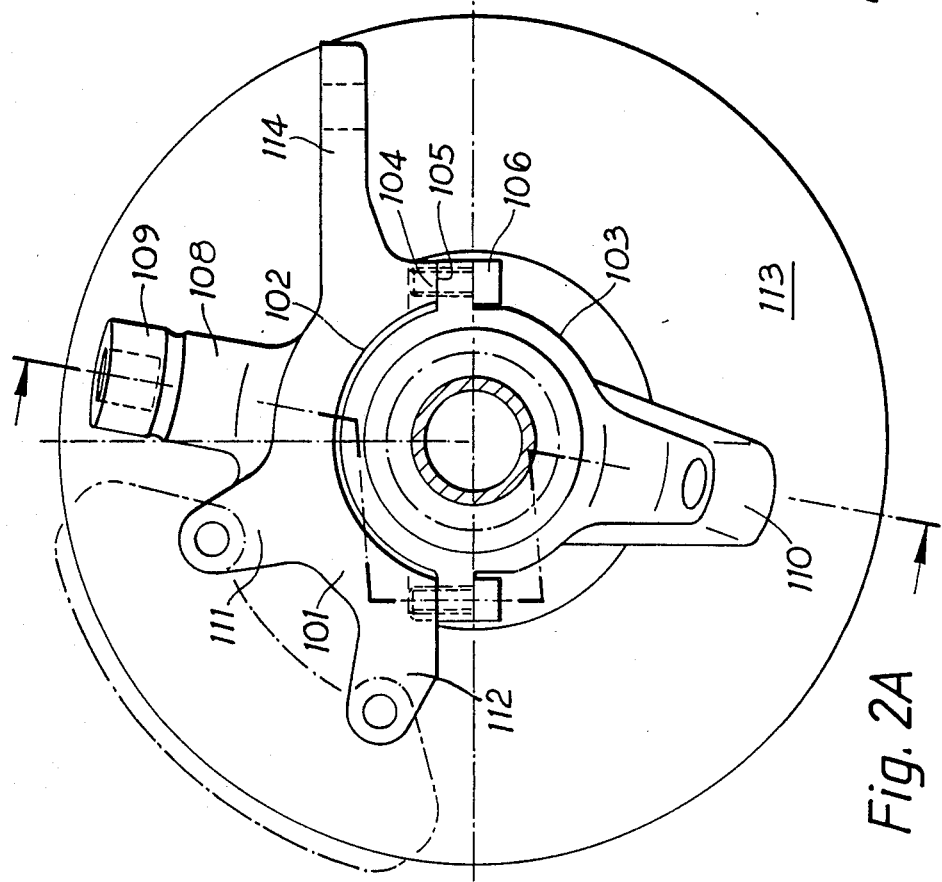
Fig. 2B
Fig. 2A

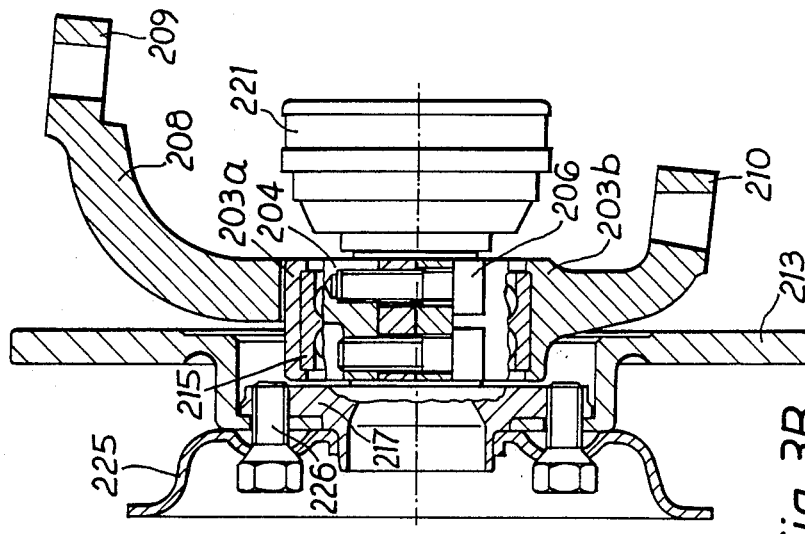
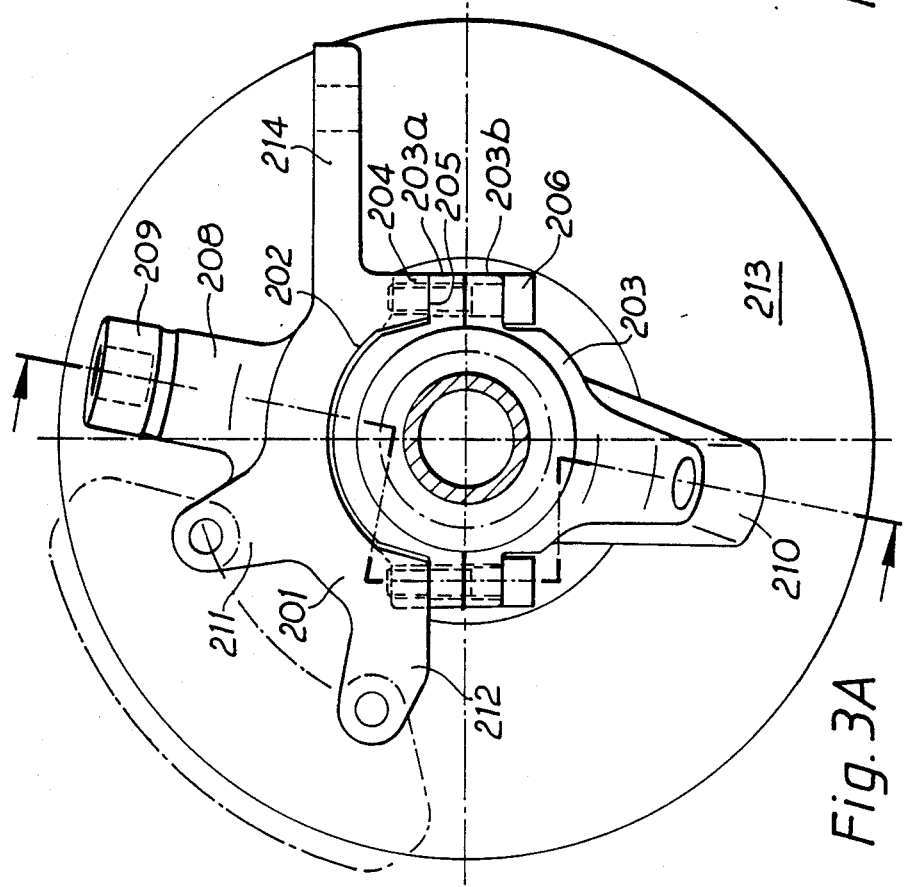

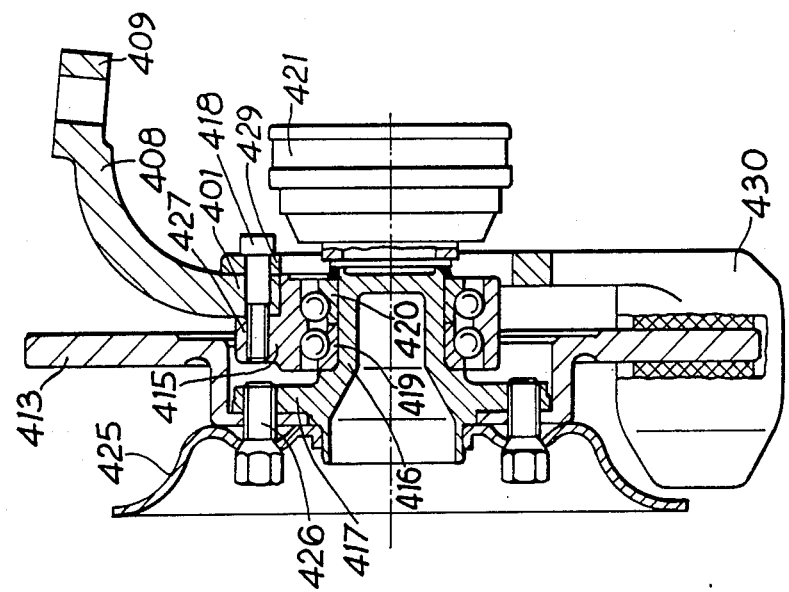
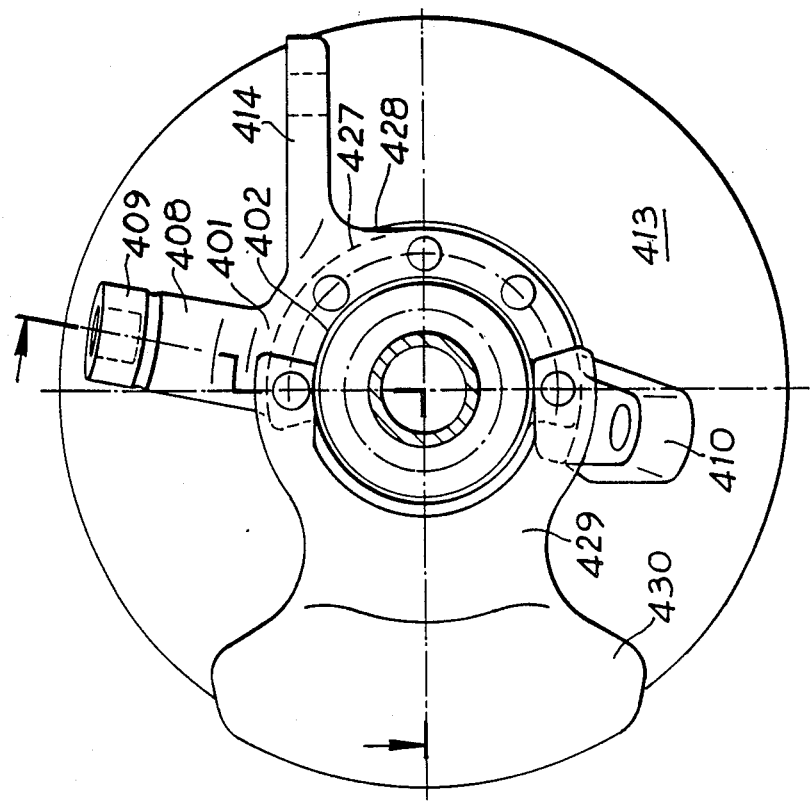
Fig. 5B
Fig. 5A

WHEEL SUPPORTING ASSEMBLY

This invention relates to a wheel supporting assembly for a motor vehicle, the assembly comprising a wheel carrier member, means for attachment of the wheel carrier member to at least one suspension component, and a unit secured to the wheel carrier member comprising a hub member, connected for torque transmission to a universal joint member and provided with a flange for wheel attachment, and bearing means by which the hub member and universal joint member are supported relative to a bearing housing for rotation about an axis.

There have been previous proposals for wheel supporting assemblies wherein a wheel bearing unit is inserted axially into a bearing-receiving formation in a wheel carrier member. A bearing assembly with a flanged outer race may be used, having accurately positioned axial bores for fasteners, and cooperating with centering means provided in the bearing-receiving formation in the wheel carrier member. With such designs, it is usual to introduce the wheel bearing and a constant velocity ratio universal joint axially from opposite ends of the bearing receiving formation of the wheel carrier member, the bearing and joint member subsequently being connected to each other for torque transmission. This complicates the assembly operation, particularly when it is being carried out in situ on a vehicle.

It has also been proposed to provide a pre-assembled unit of hub member, universal joint member, and bearing, which can be axially inserted into a suitable formation in the wheel carrier member. This results in the presence of an undesirable feature in that the outer diameter of the bearing and joint member are dependent on each other. Either the joint size has to be limited, which limits its torque transmitting ability, or the wheel carrier member has to be provided with a large opening for receiving the pre-assembled unit, larger than that necessary for a bearing outer race alone. This would mean the bearing outer race would have to be provided with an exceptionally large flange to be attached to the wheel carrier member, and the whole assembly would become very large and heavy. Such considerations apply whether the universal joint member is removable or unremovable from the bearing and hub members.

It is the object of the present invention to provide a wheel supporting assembly in which these disadvantages are overcome or reduced. Thus, an assembly is to be provided wherein a pre-assembled unit comprising a hub member, supporting bearing, and removable or unremovable universal joint member torque transmittingly connected to the hub member can be readily inserted into the wheel carrier member without causing any problems, and safely supported in it. The size of the supporting bearing should not require to be increased beyond that required to give a sufficient load bearing capacity, which will usually mean that the bearing has an outside diameter which is smaller than that of the universal joint member and the flange on the hub member for wheel attachment. Desirably the pre-assembled unit should be able to be assembled to the wheel carrier member whilst the latter is already fitted to a vehicle.

According to the invention we provide a wheel supporting assembly, comprising a wheel carrier member having means for attachment to at least one suspension component; and a unit secured thereto comprising a hub member, provided with a flange for wheel attachment and connected for torque transmission to a universal joint member, and bearing means supporting the hub member and universal joint member relative to a bearing housing for rotation about an axis; wherein said unit is received in a formation in the wheel carrier member open in a direction transversely of said axis. Preferably the formation is of non-undercut configuration, the bearing housing being held to the wheel carrier member by at least two fixing elements spaced from one another by a distance greater than an outer diameter of the bearing means.

In a wheel supporting assembly according to the invention, the ability to introduce a pre-assembled unit of hub member, joint member, and supporting bearing to the wheel carrier member in the direction transversely to the rotational axis of the unit means that the wheel carrier member has only to be provided with an opening or recess of a size determined by that of the bearing. A large opening which would be required for axial assembly of the hub member, joint member and bearing unit as above described, is not necessary. Although the advantage of the invention is realised most fully if the unit which is introduced to the wheel carrier member includes the universal joint member unremovably connected to the limb member, e.g. by an upset weld, it is still beneficial if the joint member is connected to the hub member after the latter, with its bearing means, has been fitted to the wheel carrier member. This may provide a more convenient initial assembly procedure. Thereafter the entire unit may be removed, e.g. while the wheel carrier member remains fitted in a vehicle.

The spacing of the fixing elements is preferably less than the outer diameter of the flange on the hub member for wheel attachment, and/or of the universal joint member. Such spacing of the fixing elements arises when the bearing is of the latest type which, as compared with the size of a constant velocity joint of similar performance, is of relatively smaller diameter with corresponding weight advantages. With such a relatively small bearing size, and close disposition of the fixing elements in the assembly, space becomes available in the region generally between the wheel-attachment flange and the universal joint member for the disposition of any other required elements, e.g. a brake drum for a parking brake, or sensors, detectors, or drive elements which may form part of an anti-locking braking system.

The wheel carrier member may be provided with a generally semi-cylindrical recess formation in which the bearing housing is received. Preferably the fixing elements are provided by bolted connections between flange faces of the bearing housing and the wheel carrier member.

Such faces may be parallel to the rotational axis of the wheel, either generally diametrically opposite one another about the axis or offset from the axis.

Alternatively the bearing housing wheel carrier member may be held together by bolted connections between flange faces of the bearing housing and wheel carrier member, which faces extend normal to the axis of the assembly.

A bearing cover member may be secured to the wheel carrier member, so that the bearing means, as viewed along the axis of the assembly in cross-section, is completely enclosed by the wheel carrier member and the bearing cover member. This enables the bearing housing or outer race of the bearing to be of relatively lighter design.

The bearing means may have an outer bearing race which is integral with the bearing housing. Alternatively the bearing means may have an outer bearing race which is received in a separate bearing housing. Such a separate bearing housing may be of annular form, with the outer bearing race being fitted axially thereto, or may comprise parts which are separable radially or axially from one another for fitting of the outer bearing race thereto.

In the assembly, the bearing housing may be connected to a further element, such as the bearing cover or a brake caliper element, to form a closed relatively rigid annular member. This gives the assembly the strength of wheel carrier assemblies of known type. As well as giving freedom in designing the bearing means, and the constant velocity ratio universal joint, an assembly according to the present invention further gives freedom to design appropriate connecting elements for suspension struts or arms, or steering parts. Such parts may be formed directly on the wheel carrier member, bearing housing, or bearing cover.

The invention will now be described by way of example with reference to the accompanying drawings, of which:

FIG. 1A is a diagrammatic partial axial view of one embodiment of wheel supporting assembly according to the invention;

FIG. 1B is a side view of the assembly of FIG. 1A, partly in section on the section line shown in FIG. 1A;

FIGS. 2A and 2B are views as FIG. 1, of a further embodiment of assembly according to the invention;

FIGS. 3A and 3B, 4A and 4B, 5A and 5B are respective views corresponding to those of FIG. 1, of yet further embodiments of wheel supporting assembly according to the invention.

Figure 4B:
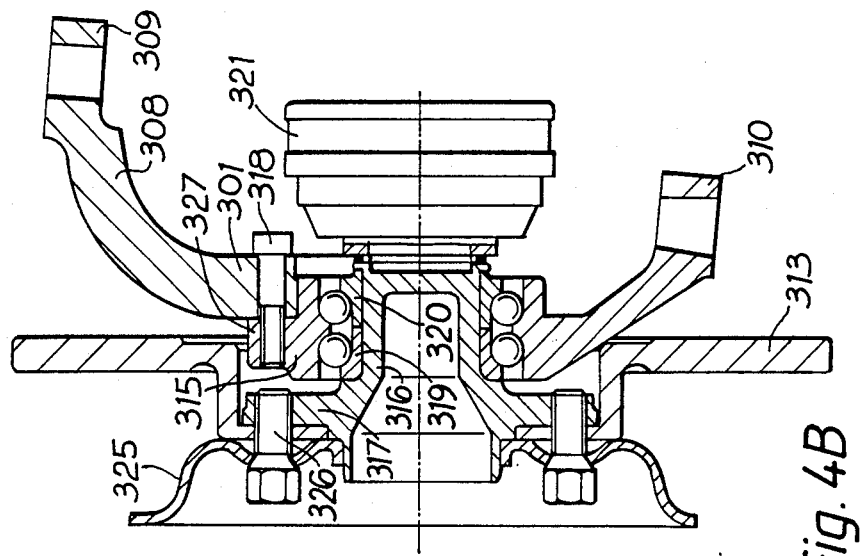

Referring firstly to FIGS. 1A and 1B, the assembly there shown comprises a wheel carrier member indicated generally at 1. The wheel carrier member supports a unit comprising a hub member, constant velocity ratio universal joint, and bearing by which the hub member and joint are rotatably mounted, and to be described in greater detail hereafter.

The wheel carrier member affords a recess 2 for reception of a bearing housing portion of the unit of hub member, universal joint and bearing. The recess 2 is of generally U-shape in the axial view of FIG. 1A, with a semi-circular base and parallel side walls, open generally downwardly and to one side to enable the aforesaid unit to be inserted in a direction transversely of the rotational axis of the hub member. The recess 2 is bounded by flange surfaces 4, which surfaces lie in a plane parallel to but spaced from the wheel rotational axis. The wheel carrier member further comprises an upstanding arm portion 8 terminating in an aperture (9) for connection to a suspension component such as a pivoted arm or wishbone or a suspension strut. The wheel carrier member further comprises a lower bracket 10 which has an aperture for connection, e.g. by way of a ball joint, to a suspension component such as a lower pivoted arm. A steering arm 14 is integral with the wheel carrier member, for connection to a steering mechanism. Finally the wheel carrier member has lugs 11, 12 for attachment of a disc brake caliper which is shown in outline in FIG. 1A.

The aforesaid unit which is accommodated in the recess 2 of the wheel carrier member comprises a hub member 16 which is integral with a wheel-attachment flange 17. A brake disc 13 is pressed on a seating of the hub member at the flange 17. A nave portion 25 of a road wheel is shown secured to the hub member by circumferentially spaced bolts of which one is seen at 26. The hub member is, at its end opposite the flange 17, connected by welding to the outer member 21 of a constant velocity ratio universal joint. The joint further comprises, in known manner, an inner member 22, a cage 23, and torque transmitting balls 24.

Between the flange 17 and joint member 21, the hub member 16 has an external seating on which are received the two inner races 19, 20 of a double row ball bearing. The inner bearing races are held in position on the hub member by an upset weld bead formed at the welded, e.g. friction welded, connection between the hub member 16 and joint member 21. The bearing has an outer race 15 which provides by its external shape an integral, somewhat U-shaped, bearing housing 3 (FIG. 1A) with outwardly extending flanges with surfaces 5 which engage the surfaces 4 on the wheel carrier member 1. The facing flanges of the wheel carrier member 1 and bearing housing 3 are secured together by bolts 6, with a pair of axially spaced bolts being provided at each flange of the bearing housing 3.

Referring now to FIGS. 2A and 2B of the drawings, these show an assembly of which many of its parts correspond to those of FIG. 1, and therefore the same reference numerals, with the addition of 100, are applied to such parts and the following description is confined to the differences between the embodiments. In FIG. 2, the recess 102 in the wheel carrier member 101 is of much shallower configuration than that of FIG. 1, and faces substantially vertically downwardly. The recess 102 is part-cylindrical in configuration, subtending an angle of a little less than 180 degrees at the rotational axis of the hub assembly. Bearing housing 103, which is formed integrally with bearing outer race 115, also has integrally formed a bracket 110 for connection to a lower suspension arm or the like. The bearing housing 103 is once again connected to the wheel carrier member 101 by bolts 106 providing a connection between the facing flanges with surfaces 104, 105 of the wheel carrier member and bearing housing, respectively, and these surfaces lie in a plane which is close to the rotational axis of the hub member and parts connected thereto.

Referring now to FIGS. 3A and 3B, like reference numerals in the 200 series are used for parts corresponding to those in the preceding figures. The configuration of the wheel carrier member 201 is substantially the same as that of FIG. 2. In this embodiment, however, the outer bearing race 215 is a component which is received in a separate bearing housing 203, which is diametrically split into upper and lower parts 203a, 203b. The lower part 203b is integral with the bracket 210. Bolts 206 serve the dual purpose of both connecting the upper and lower parts 203a, 203b of the bearing housing together, and securing them to the wheel carrier member.

Figure 4A:
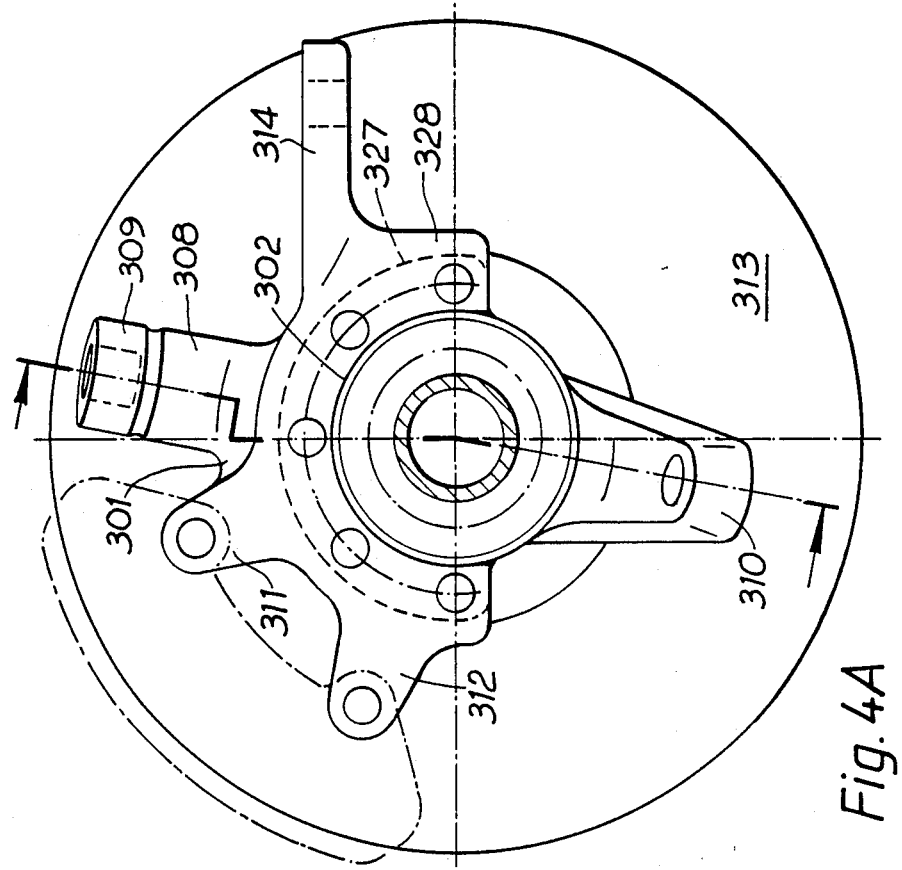

Referring now to FIGS. 4A and 4B, these show a further embodiment which differs rather more substantially from those embodiments above described. Reference numerals in the 300 series are used for equivalent parts. In this case, the wheel carrier member 301 is formed with a part-annular flange portion 328, extending in a direction normal to the wheel rotation axis to define a recess. The outer bearing race 315 is integrally formed as a bearing housing with a radially extending flange portion 327, which abuts the flange portion 328 of the wheel carrier member, to be secured together by five circumferentially spaced axially extending bolts 318. The outer bearing race 315 is further integral with bracket 310 for connection to a suspension arm.

In this embodiment, as for those of FIGS. 1 to 3, the assembly of hub member, constant velocity ratio universal joint, and bearing is assembled to the wheel carrier member by introducing the bearing housing to the recess in the wheel carrier member in a direction transversely to the rotational axis of the wheel. The recess in the wheel carrier member, defined by the flange portion 328 thereof, subtends slightly more than 180 degrees at the wheel axis.

Referring now to FIGS. 5A and 5B, (wherein reference numerals in the 400 series are used for corresponding parts to those of the previous embodiments), these show an embodiment of wheel supporting assembly wherein, as for the embodiment of FIG. 4, the unit of hub member 416 and constant velocity ratio universal joint 421 has a bearing whose outer race 415 is integral with a bearing housing affording a radial flange 427. The wheel carrier member 401 has a part annular flange portion 428, defining an opening to one side of the wheel carrier member, subtending approximately 180 degrees at the wheel axis. The bearing housing and wheel carrier member are secured together by circumferentially spaced axially extending bolts 418. In this embodiment, bracket 410 is integral with the wheel carrier member.

Two diametrically opposite ones of the bolts 418 also secure to the wheel carrier member a web 429 with integral disc brake caliper 430. The web 429, as well as affording the caliper, has the effect of stiffening the wheel carrier member by providing a structure completely surrounding the bearing outer race 430.

We claim:

1. A wheel supporting assembly, comprising a wheel carrier member having bearing receiving means and means for attachment to at least one suspension component;

and a non-disassembleable unit secured thereto comprising a wheel hub member, connected for torque transmission to a universal joint member and provided with a flange for wheel attachment, and bearing means supporting the hub member and universal joint relative to a bearing housing for rotation about an axis, the bearing being arranged on the wheel hub member axially between the universal joint member and the wheel flange, wherein said unit is received in said bearing receiving means in the wheel carrier member so as to be open in a direction transversely of said axis, said bearing receiving means being of non-undercut configuration, the bearing housing being held to the wheel carrier member by fixing elements spaced from one another by a maximum radial distance greater than an outer diameter of the bearing means, the outer diameter of the bearing means being smaller than that of an outer part of the universal joint member.

2. An assembly according to claim 1, wherein the fixing elements comprise bolted connected between flange faces of the bearing housing and wheel carrier member, which faces are parallel to said axis.

3. An assembly according to claim 2, wherein said faces are generally diametrically opposite one another about said axis.

4. An assembly according to claim 2, wherein said faces are offset from said axis.

5. An assembly according to claims 2, wherein each fixing element comprises a double bolted connection.

6. An assembly according to claim 1, wherein the fixing elements comprise bolted connections between flange faces of the bearing housing and wheel carrier member, which faces are normal to said axis.

7. An assembly according to claim 6, wherein said flange faces are partially annular.

8. An assembly according to claim 7, wherein a plurality of bolted connections are provided between said flange faces.

9. An assembly according to claim 1 further comprising a bearing cover member, secured to the wheel carrier member so that the bearing means, as viewed along said axis in cross section, is completely enclosed by the wheel carrier member and bearing cover member.

10. An assembly according to claim 1, wherein at least one of the wheel carrier member, bearing housing, and a bearing cover member, is provided with elements for connection to suspension, steering, or brake components.

11. An assembly according to claim 10, wherein a disc brake caliper is formed integrally with one of the wheel carrier member, bearing housing, and bearing cover member.

12. An assembly according to claim 1, wherein the bearing means has an outer bearing race integral with the bearing housing.

13. An assembly according to claim 1, wherein the bearing means has an outer bearing race received in a separate bearing housing.

14. An assembly according to claim 13, wherein said bearing housing is of annular form, the outer bearing race being fitted axially thereto.

15. An assembly according to claim 13, wherein said bearing housing comprises parts radially separable along axially extending joints for fitting of the outer bearing race thereto.

16. An assembly according to claim 15, wherein said bearing housing parts are held together by the fixing elements which also secure the bearing housing to the wheel carrier member.

17. An assembly according to claim 1, wherein the hub member is unremovably connected to the universal joint member.

18. An assembly according to claim 17, wherein said unremovable connection is provided by an upset weld.

19. An assembly according to claim 18 comprising at least one inner bearing race received on the hub member and held thereon by said weld.

20. An assembly according to claim 1, wherein the maximum radial spacing of the fixing elements from one another is smaller than the diameter of the outer part of the universal joint member.

21. An assembly according to claim 1, wherein the maximum radial spacing of the fixing elements is smaller than the outer diameter of the flange for wheel attachment.

* * * * *